(12) United States Patent
Suganuma et al.

(10) Patent No.: US 8,109,049 B2
(45) Date of Patent: Feb. 7, 2012

(54) SOLAR BATTERY MODULE DEVICE

(75) Inventors: Yoshiyuki Suganuma, Tokyo (JP); Shinsuke Miyamoto, Tokyo (JP); Naoki Ito, Tokyo (JP); Hiroyoshi Takikawa, Tokyo (JP); Issei Suzuki, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 201 days.

(21) Appl. No.: 12/599,868

(22) PCT Filed: May 14, 2007

(86) PCT No.: PCT/JP2007/059886
§ 371 (c)(1),
(2), (4) Date: Nov. 12, 2009

(87) PCT Pub. No.: WO2008/139610
PCT Pub. Date: Nov. 20, 2008

(65) Prior Publication Data
US 2010/0218810 A1  Sep. 2, 2010

(51) Int. Cl.
*E04H 14/00* (2006.01)
(52) U.S. Cl. ............ 52/173.3; 52/780; 248/237
(58) Field of Classification Search ........... 52/173.3, 52/656.1, 476, 762, 780; 248/237
See application file for complete search history.

(56) References Cited

U.S. PATENT DOCUMENTS

| 4,172,739 A | 10/1979 | Tassen |
| 2004/0011354 A1 | 1/2004 | Erling |
| 2009/0229654 A1 | 9/2009 | Morita et al. |
| 2010/0132767 A1* | 6/2010 | Miyamoto et al. ............ 136/251 |

FOREIGN PATENT DOCUMENTS

| EP | 1 531 498 | 5/2005 |
| EP | 1531498 A2 * | 5/2005 |
| EP | 1 710 651 | 10/2006 |

(Continued)

OTHER PUBLICATIONS

The Written Opinion of the International Searching Authority (Form PCT/ISA/237) dated Aug. 21, 2007, issued in the corresponding International Patent Application No. PCT/JP2007/059886, and an English Translation thereof.

(Continued)

*Primary Examiner* — William Gilbert
*Assistant Examiner* — Paola Agudelo
(74) *Attorney, Agent, or Firm* — Buchanan, Ingersoll & Rooney PC (57) ABSTRACT

A solar battery module device includes a solar cell module formed by arranging a plurality of solar battery cells; a rack-shaped frame having a substantially rectangular shape supporting an outer-edge portion of the solar cell module by surrounding a whole periphery of the outer-edge portion; and a reinforcing frame that is bridged over between two opposite sides of the rack-shaped frame by forming a predetermined gap between the reinforcing frame and a back surface of the solar cell module, and supports the solar cell module by being brought into contact with the back surface of the solar cell module when the solar cell module is bent. The reinforcing frame is engaged with engagement notches formed on the back surface of the rack-shaped frame.

8 Claims, 7 Drawing Sheets

FOREIGN PATENT DOCUMENTS

| | | |
|---|---|---|
| GB | 1 576 057 | 10/1980 |
| JP | 09-148612 | 6/1997 |
| JP | 09148612 A * | 6/1997 |
| JP | 10-294485 | 11/1998 |
| JP | 10-308522 | 11/1998 |
| JP | 2003-031833 | 1/2003 |
| JP | 2004-006625 | 1/2004 |
| JP | 2004-165556 | 6/2004 |
| JP | 2006-278537 | 10/2006 |
| WO | WO 2006/098473 A1 | 9/2006 |

OTHER PUBLICATIONS

Supplementary European Search Report dated Sep. 22, 2010, issued in the corresponding European Patent Application No. 07743321.7-1528.

European Search Report dated Sep. 22, 2010, issued in the corresponding European Patent Application No. 10001435.6-1528.

Official Action issued on Jul. 25, 2011 by the European Patent Office in corresponding European Patent Application No. 10 001 435.6.

* cited by examiner

SOLAR BATTERY MODULE DEVICE

TECHNICAL FIELD

The present invention relates to a solar battery module device installed on a construction such as a house and a building.

BACKGROUND ART

Conventionally, solar battery module devices with the following configuration are used at various places and for various purposes. A transparent substrate (glass) is arranged at a light-receiving side, plural solar battery cells connected in series, or in parallel, are arranged on the back side of the transparent substrate, and the solar battery cells are then sealed with a sealing resin to constitute a solar cell module. A frame is fitted to an outer-edge portion of the solar cell module, thereby providing a solar battery module device. Bigger and bigger solar battery module devices are being manufactured in recent years with the aim to lower cost per unit output and to shorten the time required for production and line connection work. However, with an increase in the size, the load resistance performance of the surface of the transparent substrate degrades. In this solar battery module device, a predetermined strength is maintained by the transparent substrate and the frame.

Solar battery module devices are generally installed on a construction, such as a house and a building, where they are exposed to the weather. When, for example, snow accumulates on the top surface the solar battery module device, a positive pressure that is operative to vertically press down the solar battery module device acts on the solar battery module device. On the other hand, a negative pressure that is operative to push the solar battery module device acts on the solar battery module device due to wind and the like. Because the top surface of the solar cell module, which functions as a light-receiving surface, has a wide planer structure with a large area, the module is vertically bent in a curve when receiving the positive pressure and the negative pressure.

Various techniques have been conventionally employed to avoid breakage of the module due to downward bending thereof by the positive pressure that is operative to vertically press down the module. One such conventional technique proposes to provide a reinforcing frame on a back surface of the module. In this configuration, when the module is bent downward, the module is stopped from being bent by more than a predetermined amount, by the reinforcing frame, and thus breakage can be prevented (see, for example, Patent Document 1).

Patent Document 1: Japanese Patent Application Laid-open No. 2004-6625

DISCLOSURE OF INVENTION

Problem to be Solved by the Invention

To achieve cost reduction by simplifying a manufacturing process in fitting the reinforcing frame of the solar battery module device having the configuration described above, a configuration enabling the reinforcing frame to be easily fitted is conventionally desired. Furthermore, when the reinforcing frame is to be fitted to an outer-edge portion of the solar cell module by the same device (operation) as a device (operation) that arranges a rack-shaped frame, the device (operation) becomes complex. Consequently, there is a need for improvement that can solve this problem.

Moreover, in the conventional technique, if the reinforcing frame is fixed firmly to the back surface of the solar cell module, in an event that the solar cell module is pulled upward when a negative pressure acts on the solar cell module, the back surface of the solar cell module may get separated from the reinforcing frame. Consequently, there is a need for improvement that can solve this problem. On the other hand, when the reinforcing frame is not fixed firmly to the back surface of the solar cell module, i.e., just made to come in contact with the back surface, water and/or dust get accumulated between the solar cell module and the reinforcing frame, and cause malfunction. Consequently, there is a need for improvement that can solve this problem.

The present invention has been achieved to solve the above problems, and an object of the invention is to provide a solar battery module device to which the reinforcing frame can be easily fitted. Another object of the present invention is to provide a solar battery module device in which water and/or dust does not accumulate between the reinforcing frame and the solar battery module device so that the back surface of the solar cell module is not damaged. This is achieved by forming a gap between the solar cell module and the reinforcing frame. Still another object of the present invention is to provide a solar battery module device in which an appropriate gap can be easily formed between the solar cell module and the reinforcing frame.

Means for Solving Problem

To solve the above problems and to achieve the above objects, according to an aspect of the present invention, there is provided a solar battery module device including a solar cell module formed by arranging a plurality of solar battery cells; a rack-shaped frame having a substantially rectangular shape supporting an outer-edge portion of the solar cell module by surrounding a whole periphery of the outer-edge portion; and a reinforcing frame that is bridged over between two opposite sides of the rack-shaped frame by forming a predetermined gap between the reinforcing frame and a back surface of the solar cell module, and supports the solar cell module by being brought into contact with the back surface of the solar cell module when the solar cell module is bent, wherein the reinforcing frame is engaged with engagement notches formed on the back surface of the rack-shaped frame.

Effect of the Invention

According to the present invention, because the reinforcing frame is positioned by being engaged with engagement notches formed on a back surface of a rack-shaped frame, the reinforcing frame can be easily fitted to the rack-shaped frame.

EXPLANATIONS OF LETTERS OR NUMERALS 1, 1B long-side frame (first frame)
2 short-side frame (second frame)
1a frame main body
1b module supporting unit
1c internal flange
1d engagement notch
1e positioning projection (vertical-movement locking unit)
1g first rib (vertical-movement locking unit, horizontal-movement locking unit)
1h second rib (vertical-movement locking unit, horizontal-movement locking unit)
3, 3B, 3C, 3D, 3E, 3F, 3G reinforcing frame
3a frame main body
3b back-surface side flange
3c module-side flange
3d end-surface screw hole
3e side-wall surface
7 screw (second fixing screw)
10 rack-shaped frame
15 solar battery cell
20 solar cell module
20a terminal box
20b cable
H gap

BEST MODE(S) FOR CARRYING OUT THE INVENTION

Exemplary embodiments of a solar battery module device according to the present invention will be explained below in detail with reference to the accompanying drawings. The present invention is not limited to the embodiments.

First Embodiment

Figure 1:
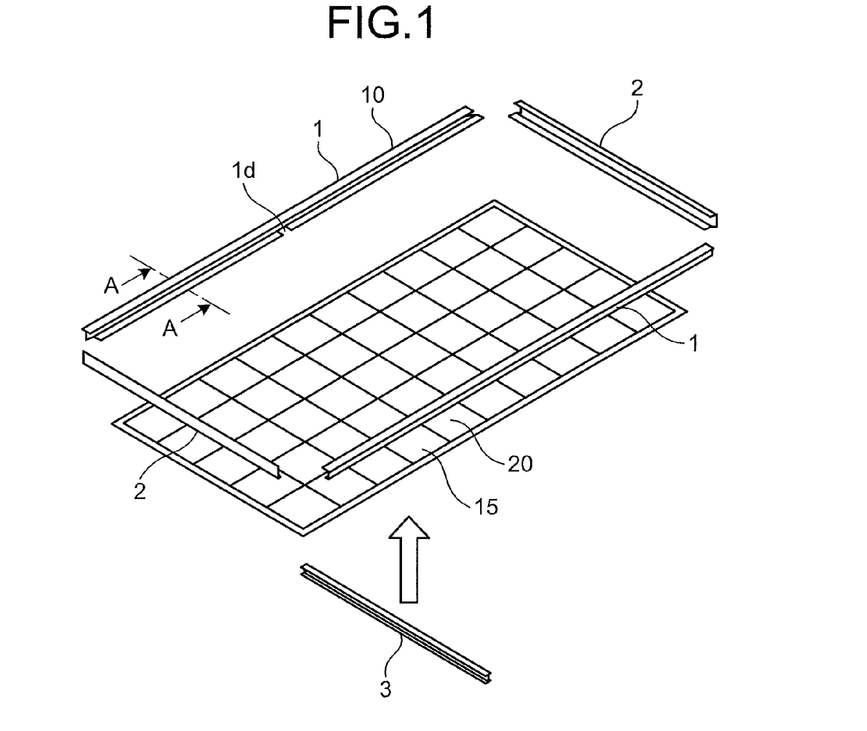
FIG. 1 is a perspective view of a state in an initial step in an assembly process of a solar battery module device according to a first embodiment of the present invention.
Figure 2:
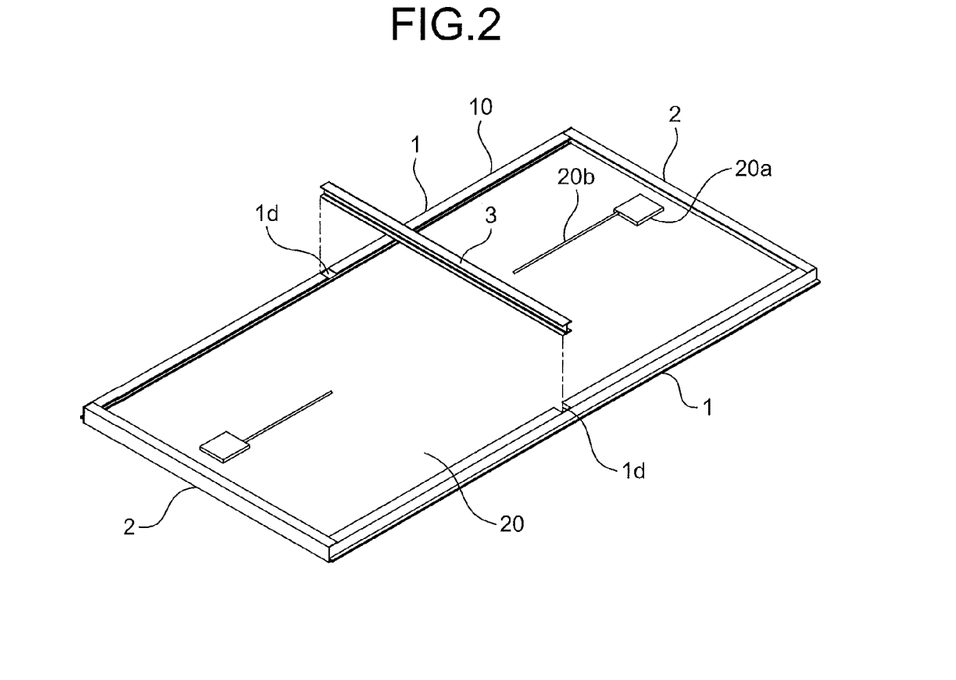
FIG. 2 is a perspective view of a state that a reinforcing frame is fitted from a back side to an intermediate assembly, the intermediate assembly being an article obtained by fixing a rack-shaped frame to an outer-edge portion of a solar cell module.
Figure 3:
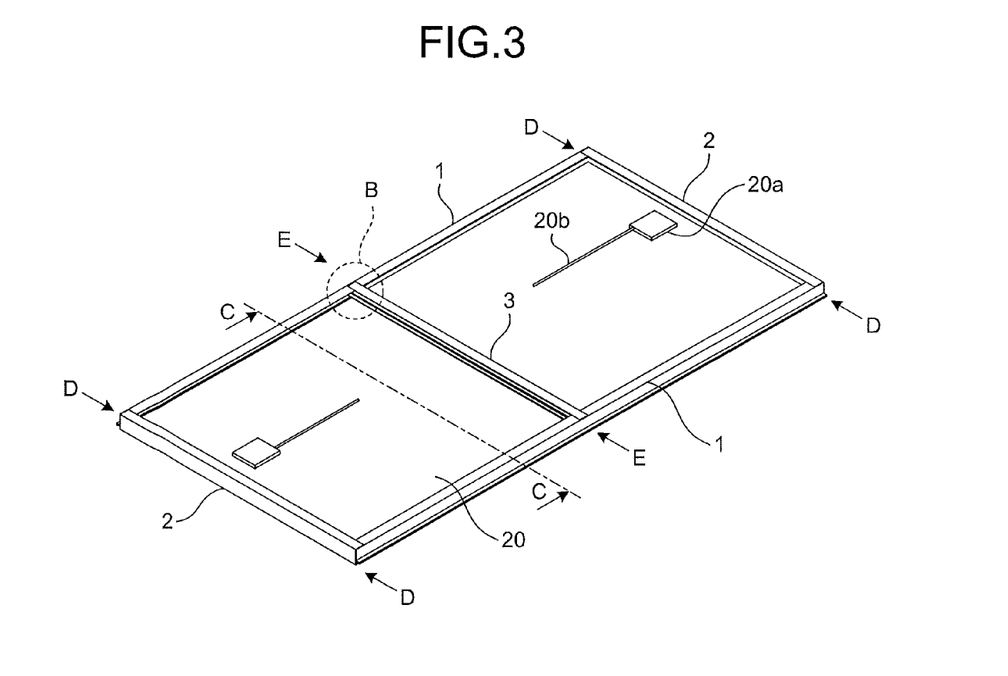
FIG. 3 is a perspective view of a state that fitting of the reinforcing frame to the intermediate assembly is completed.
Figure 4:
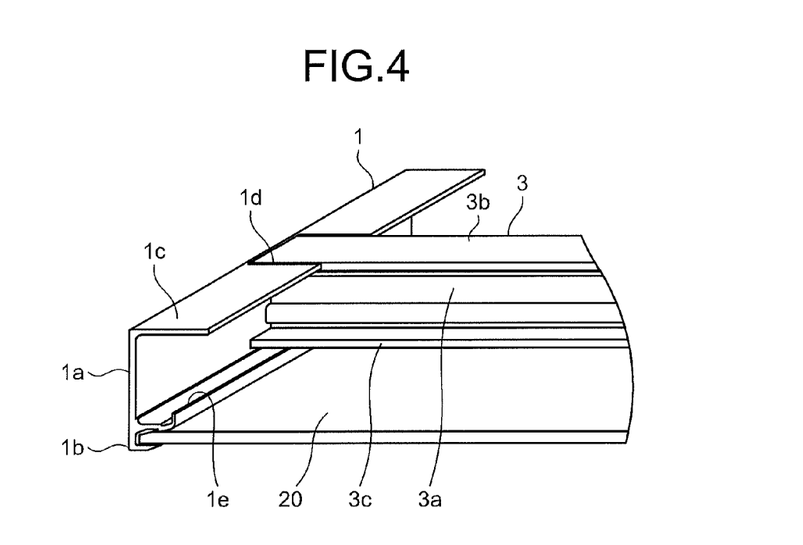
FIG. 4 is an enlarged perspective view of a portion B where the reinforcing frame is engaged with a notch of a rack-shaped frame in FIG. 3.
Figure 5:
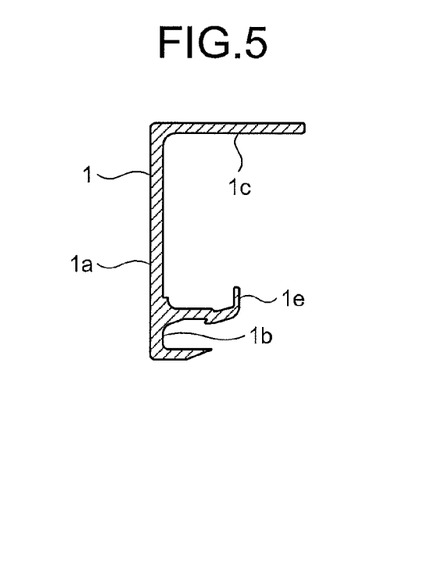
FIG. 5 is a cross-sectional arrow view cut along a line A-A in FIG. 1, depicting a cross-sectional shape of a long-side frame.
Figure 6:
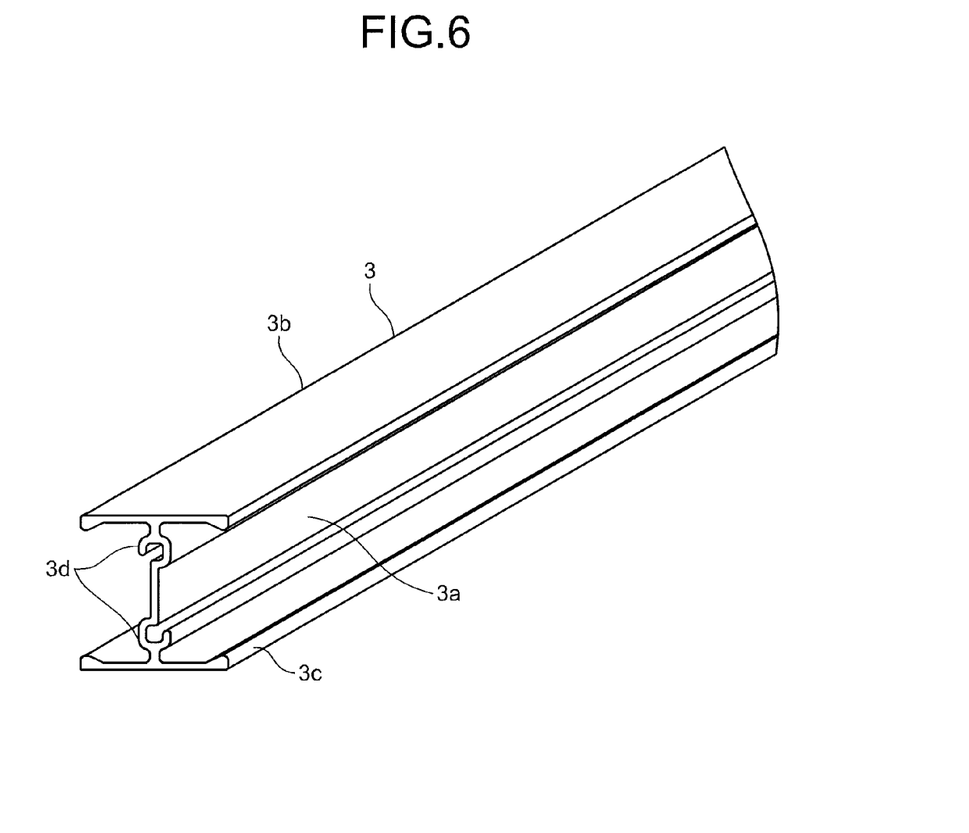
FIG. 6 is a perspective view depicting in detail the shape of the reinforcing frame.
Figure 7:
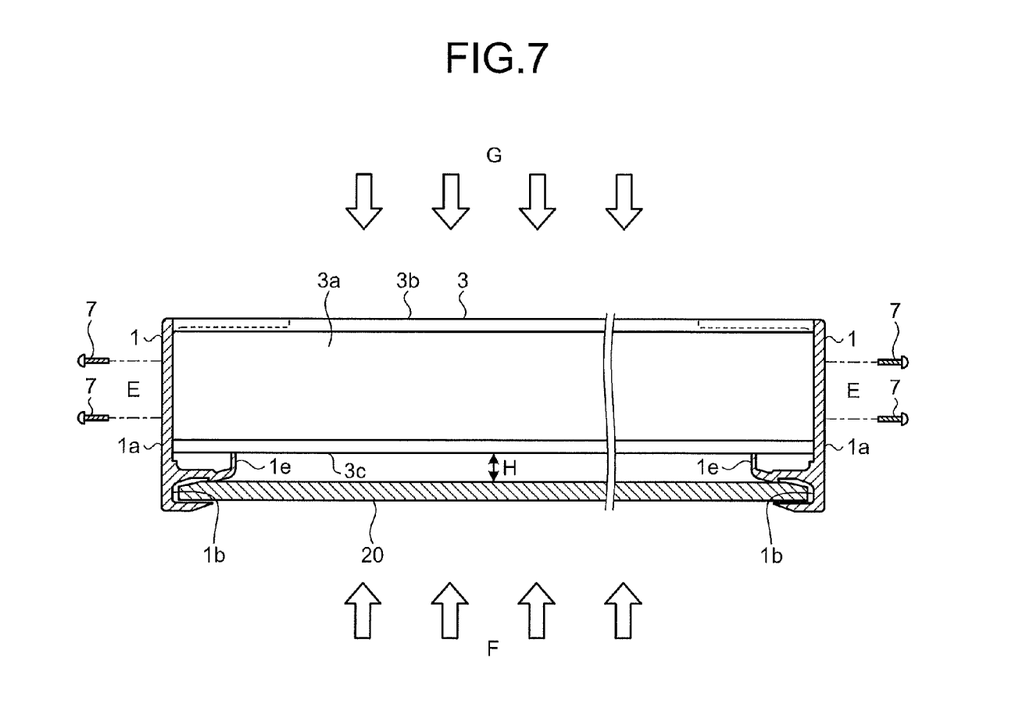
FIG. 7 is a cross-sectional arrow view cut along a line C-C in FIG. 3, depicting a state that a predetermined space is formed between the solar cell module and the reinforcing frame.

FIG. 1 is a perspective view of a state in an initial step in an assembly process of a solar battery module device according to a first embodiment of the present invention. FIG. 2 is a perspective view of a state that a reinforcing frame is fitted from a back side to an intermediate assembly, the intermediate assembly being an article obtained by fixing a rack-shaped frame to an outer-edge portion of a solar cell module. FIG. 3 is a perspective view of a state that fitting of the reinforcing frame to the intermediate assembly is completed. FIG. 4 is an enlarged perspective view of a portion B where the reinforcing frame is engaged with a notch of the rack-shaped frame in FIG. 3. FIG. 5 is a cross-sectional arrow view cut along a line A-A in FIG. 1, depicting a cross-sectional shape of a long-side frame. FIG. 6 is a perspective view depicting in detail the shape of the reinforcing frame. FIG. 7 is a cross-sectional arrow view cut along a line C-C in FIG. 3, depicting a state that a predetermined space is formed between the solar cell module and the reinforcing frame. FIG. 1 depicts a state that the solar cell module is viewed from a front side (light receiving surface) thereof. On the other hand, FIGS. 2 and 3 depict a state that the solar cell module is viewed from a back side thereof.

The solar battery module device includes a solar cell module 20 of a substantially rectangular plane shape. Furthermore, a rack-shaped frame 10 of a rectangular rack shape is provided surrounding the whole periphery of an outer-edge portion of the solar cell module 20 to support the solar cell module 20 via the outer-edge portion. Moreover, a reinforcing frame 3 fitted to the rack-shaped frame 10.

As shown in FIG. 1, the solar cell module 20 includes a plurality of series-connected or parallel-connected solar battery cells 15 that are arranged in a two-dimensional matrix. The whole surface of a light-receiving surface side of the solar battery cells 15 is covered by a transparent substrate (glass). The solar battery cells 15 are sealed with a sealing resin. The rack-shaped frame 10 is an extrusion-molded product made of aluminum, for example, and is configured by a pair of opposite long-side frames (first frames) 1, 1, and a pair of short-side frames (second frames) 2, 2 coupled between both ends of the long-side frames 1, 1. The pair of long-side frames 1, 1 and the pair of short-side frames 2, 2 are coupled to each other to form the rack-shaped frame 10 of a rectangular rack shape. The rack-shaped frame 10 reinforces the solar cell module 20 and is fitted to a mount (not shown) provided on a construction such as a house and a building. The reinforcing frame 3 is fitted to the rack-shaped frame 10 from the back side of the solar cell module 20.

As shown in FIG. 2, engagement notches 1d, 1d for engaging the reinforcing frame 3 are provided at central portions of back surfaces of the two long-side frames 1, 1. Both ends of the reinforcing frame 3 are settled in these engagement notches 1d, 1d from the back side, and are fitted to the long-side frames 1, 1. That is, both ends of the reinforcing frame 3 are inserted into the engagement notches 1d, 1d from the back side of the solar cell module 20, and are fitted to the long-side frames 1, 1. Terminal boxes 20a and cables 20b, which extend from the terminal boxes 20a, are also provided on the back surface of the solar cell module 20.

In FIG. 3, the reinforcing frame 3 is fitted to the rack-shaped frame 10 by being bridged over between the opposite long-side frames 1, 1 of the rack-shaped frame 10 as described above. In this case, as shown in FIG. 4, each end of the reinforcing frame 3 is engaged with the engagement notch 1d provided on the back surface of the long-side frame 1 and is accurately positioned. The short-side frames 2, 2 are fastened to the long-side frames 1, 1 by screws (first fixing screws) (not shown) inserted into through-holes formed at the ends of the long-side frames 1, 1 from directions of arrows D in FIG. 3. The reinforcing frame 3 is fastened by screws (second fixing screws) 7 (FIG. 7) (not shown) inserted into through-holes formed at central portions of the long-side frames 1, 1 from directions of arrows E in FIG. 3. That is, the short-side frames 2, 2 and the reinforcing frame 3 are fastened by the screws (fixing screws) inserted from the same directions.

As shown in FIG. 5, the long-side frames 1, 1 have a cross section in a substantially U shape to have predetermined strength. Each long-side frame 1 has a plane-shaped frame main body 1a extended to a direction perpendicular to the solar cell module 20, a module supporting unit 1b extended from an edge of the frame main body 1a at a side of the solar cell module 20 to the inside of the rack-shaped frame 10 and supporting the solar cell module 20, and an internal flange 1c formed by being extended from the frame main body 1a at an opposite side of the module supporting unit 1b to the inside of the rack-shaped frame 10. The module supporting unit 1b has a cross section of a substantially U shape having an opening inside the rack-shaped frame 10, and supports the outer-edge portion of the solar cell module 20 by holding the outer-edge portion at the inside of the U shape.

The internal flange 1c extends in direction that is parallel to the solar cell module 20. The rack-shaped frame 10 has the internal flange 1c fitted to a mount (not shown), and supports the solar cell module 20 from the mount. The engagement notch 1d is formed by having the internal flange 1c notched by only a width of the reinforcing frame 3. A front edge at the back side of the module supporting unit 1b having the cross section of a substantially U shape is formed to be folded to the back side, and it is a positioning projection (a vertical-movement locking unit) 1e that positions the reinforcing frame 3 in a depth direction by being brought into contact with the reinforcing frame 3 when the reinforcing frame 3 is inserted into the engagement notch 1d.

As shown in FIG. 6, the reinforcing frame 3 has a substantially H shape in its cross section, and includes a plane-shaped frame main body 3a that extends in a direction that is perpendicular to the solar cell module 20, the back side flange 3b spread from a back-surface edge of the frame main body 3a to both sides in parallel with the solar cell module 20, and a module-side flange 3c spread from an edge at a side of the solar cell module 20 of the frame main body 3a to both sides in parallel with the solar cell module 20. Two end-surface screw holes 3d are formed on an end surface of the frame main body 3a.

In FIG. 7, as described above, at a front end of the module supporting unit 1b, there is provided the positioning projection (the vertical-movement locking unit) 1e that restricts a movement of the reinforcing frame to a direction of the solar cell module by being brought into contact with the reinforcing frame 3 when the reinforcing frame 3 is inserted into the engagement notch 1d. With this arrangement, the reinforcing frame 3 is arranged with a predetermined gap H between the back surface of the solar cell module 20 and the reinforcing frame 3. The solar cell module 20 can experience a positive pressure as indicated by arrows F and a negative pressure as indicated by arrows G in FIG. 7, as described in the above background art. The reinforcing frame 3 supports the back surface of the solar cell module 20 when the solar cell module 20 is bent by a predetermined amount by the positive pressure.

As described above, in the solar battery module device of the present embodiment, because both ends of the reinforcing frame 3 are fitted to the long-side frames 1, 1 by being inserted into the engagement notches 1d, 1d from the back side of the solar cell module 20, the reinforcing frame 3 can be easily fitted at a later stage to an assembly having the rack-shaped frame 10 arranged in the outer-edge portion of four sides of the solar cell module 20. Therefore, the reinforcing frame 3 can be easily fitted at a later stage by a device (operation) different from a device (operation) that arranges the long-side frames 1, 1 and the short-side frames 2, 2 on the outer-edge portion of the solar cell module 20. Accordingly, workability in the manufacturing process is improved.

In the solar battery module device of the present embodiment, the short-side frames 2, 2 are coupled to the long-side frames 1, 1 by having the screws piercing through both ends of the long-side frames 1, 1 fastened to the end-surface screw holes. Moreover, the reinforcing frame 3 is coupled to the long-side frames 1, 1 by having the screws piercing through the long-side frames 1, 1 fastened to the end-surface screw holes from a direction same as a direction of the screws that fix the short-side frames 2, 2. Therefore, screw fastening directions are matched, and workability in the manufacturing process is improved.

Furthermore, in the solar battery module device of the present embodiment, the engagement notch 1d is formed by having the internal flange 1c of the long-side frames 1, 1 notched by only the width of the reinforcing frame 3. The rack-shaped frame 10 has the positioning projection (the vertical-movement locking unit) 1e that restricts a movement of the reinforcing frame 3 to a direction of the solar cell module 20 by being brought into contact with the reinforcing frame 3 inserted into the engagement notch 1d. Therefore, the gap H is formed between the solar cell module 20 and the reinforcing frame 3. With this arrangement, the back surface of the solar cell module 20 is not damaged, and water and/or dust do not accumulate between the reinforcing frame 3 and the solar cell module 20. Because the reinforcing frame 3 is accurately positioned by virtue of the positioning projection 1e, a gap in an appropriate size can be easily formed between the solar cell module 20 and the reinforcing frame 3.

Further, in the solar battery module device of the present embodiment, the reinforcing frame 3 has a point-symmetrical shape in a cross-sectional shape orthogonal to an axis in a longitudinal direction. Therefore, there is no directionality of upside or downside at assembling, and thus workability in the manufacturing process is improved.

Second Embodiment

Figure 8:
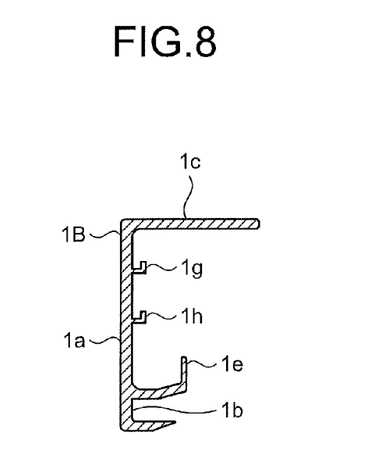
FIG. 8 is a cross-sectional view of a cross-sectional shape of a long-side frame of a solar battery module device according to a second embodiment of the present invention.
Figure 9:
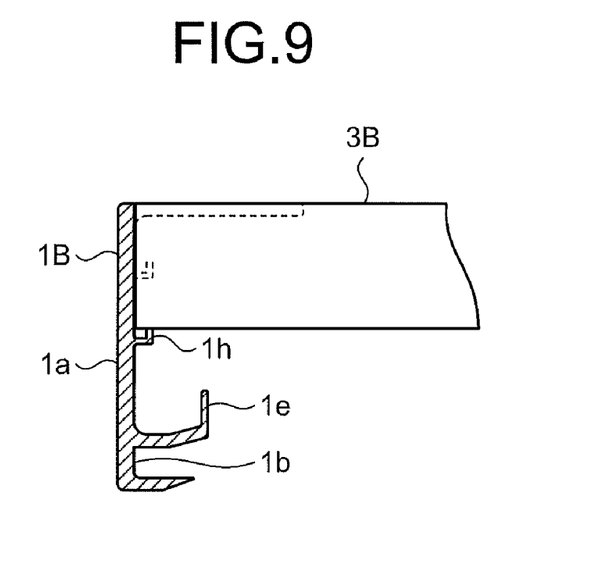
FIG. 9 is a cross-sectional view of a state that a second rib is selected and applied to a reinforcing frame having a smaller height than that of the reinforcing frame in the first embodiment.
Figure 10:
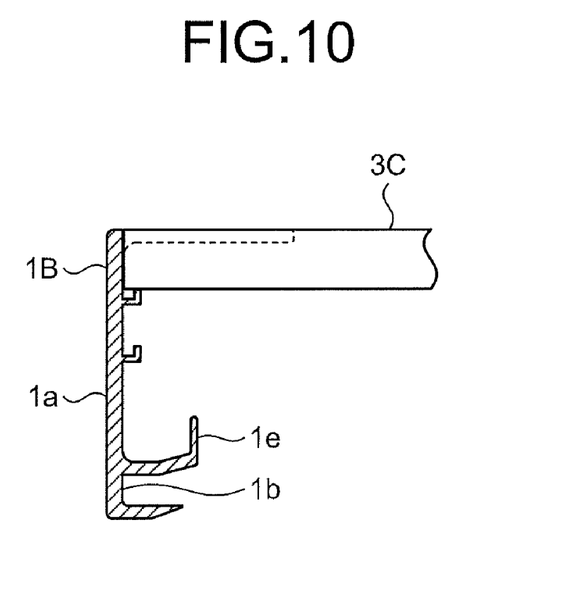
FIG. 10 is a cross-sectional view of a state that a first rib is selected and applied to a reinforcing frame having a smaller height than that of the reinforcing frame in FIG. 9.

FIG. 8 is a cross-sectional view of a cross-sectional shape of a long-side frame of a solar battery module device according to a second embodiment of the present invention. FIG. 9 is a cross-sectional view of a state that a second rib is selected and applied to a reinforcing frame having a smaller height than that of the reinforcing frame in the first embodiment. FIG. 10 is a cross-sectional view of a state that a first rib is selected and applied to a reinforcing frame having a smaller height than that of the reinforcing frame in FIG. 9. As shown in FIG. 8, a long-side frame (a first frame) 1B according to the present embodiment has a first rib 1g and a second rib 1h that extended in a direction parallel to the positioning projection 1e, between the module supporting unit 1b and the internal flange 1c. Other configurations are identical to those of the first embodiment.

The first rib 1g and the second rib 1h are vertical-movement locking units, and one of these ribs is selectively used. When the second rib 1h is selected, the first rib 1g is cut by a width of the reinforcing frame 3, and as shown in FIG. 9, the second rib 1h is applied to a reinforcing frame 3B having a smaller height than that of the reinforcing frame of the first embodiment. When the first rib 1g is selected, as shown in FIG. 10, it is applied to a reinforcing frame 3C having a smaller width than that of the reinforcing frame 3B.

As described above, the long-side frame 1B of the solar battery module device according to the present embodiment has plural vertical-movement locking units provided at different positions in an inserting direction of the reinforcing frame 3. By selecting one of the plural vertical-movement locking units, the long-side frame can be applied to plural reinforcing frames having different heights.

Third Embodiment

Figure 11:
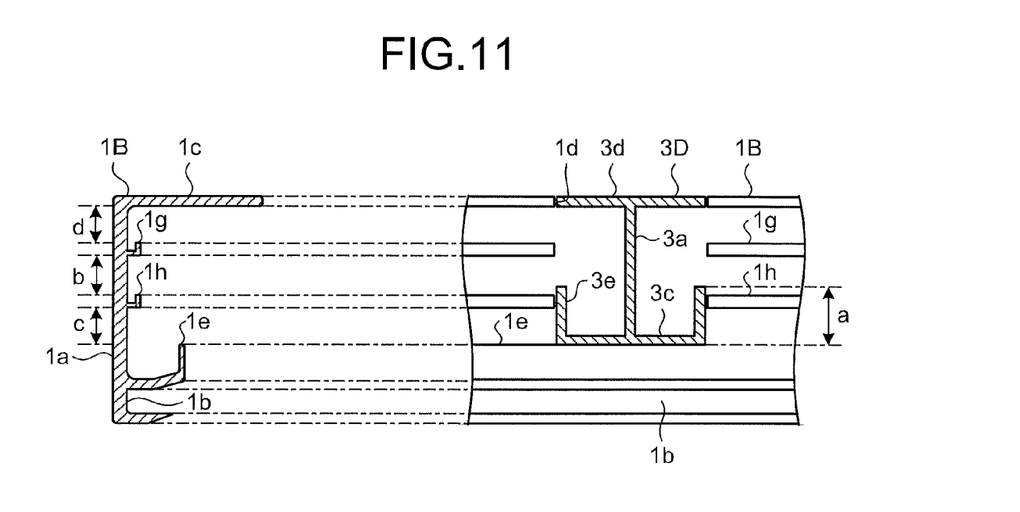
FIG. 11 is a cross-sectional view of a cross-sectional shape of a long-side frame and a cross-sectional shape of a reinforcing frame of a solar battery module device according to a third embodiment of the present invention.

FIG. 11 is a cross-sectional view of a cross-sectional shape of a long-side frame and a cross-sectional shape of a reinforcing frame of a solar battery module device according to a third embodiment of the present invention. A reinforcing frame 3D according to the present embodiment has side-wall surfaces 3e extended in parallel with the frame main body 3a from both-side edges of the module-side flange 3c to a back-surface direction. A height a of the side-wall surfaces 3e is set larger than any one of a distance b from the first rib 1g to the second rib 1h, a distance c from the second rib 1h to the positioning projection 1e, and a distance d from the internal flange 1c to the first rib 1g. Other configurations are identical to those of the second embodiment.

According to the solar battery module device having the above configuration, the first rib 1g and the second rib 1h cut in a width of the reinforcing frame 3D guide the side-wall surfaces 3e of the reinforcing frame 3D, and facilitate insertion of the reinforcing frame 3D into the engagement notch 1d. After the reinforcing frame 3D is inserted into the engagement notch 1d, the first rib 1g and the second rib 1h are brought into contact with the side-wall surfaces 3e of the reinforcing frame 3D, and become locking units in a horizontal direction that restrict a movement of the reinforcing frame 3D to a direction along the rack-shaped frame 10. With this arrangement, the reinforcing frame 3D can be positioned more accurately.

Fourth Embodiment

Figure 12:
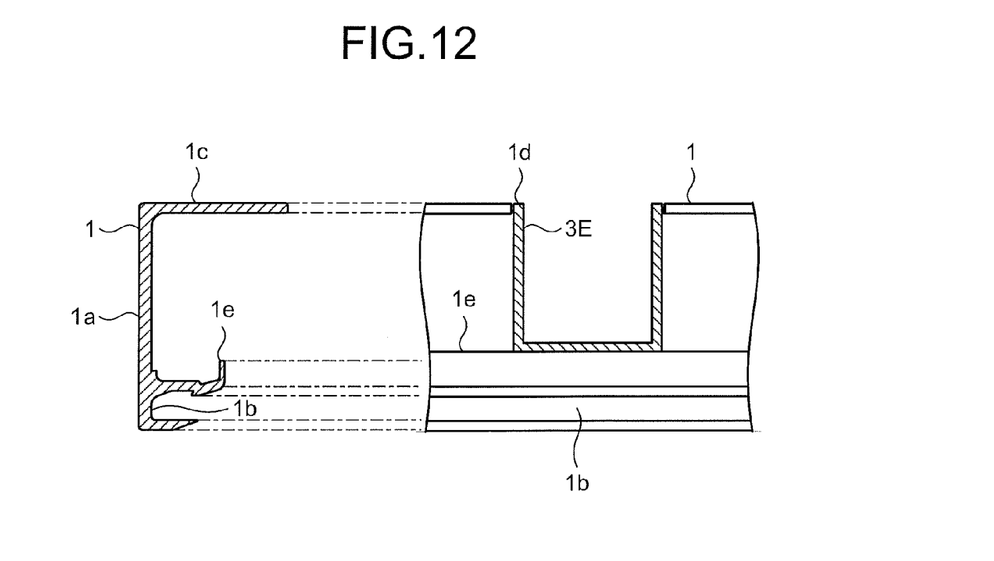
FIG. 12 is a cross-sectional view of a cross-sectional shape of a long-side frame and a cross-sectional shape of a reinforcing frame of a solar battery module device according to a fourth embodiment of the present invention.

FIG. 12 is a cross-sectional view of a cross-sectional shape of a long-side frame and a cross-sectional shape of a reinforcing frame of a solar battery module device according to a fourth embodiment of the present invention. A cross-sectional shape of a reinforcing frame 3E in the present embodiment has a U shape having an opening at a back side thereof. That is, the reinforcing frame 3E has sidewall surfaces extended to a direction of a total height. Other configurations are identical to those of the first embodiment.

According to the solar battery module device having the above configuration, the reinforcing frame 3E can be easily inserted into the engagement notch 1d by being guided by own sidewall surfaces. After the reinforcing frame 3E is inserted into the engagement notch 1d, the reinforcing frame 3E is brought into contact with the opening of the engagement notch 1d, and a movement of the reinforcing frame 3E to a direction along the rack-shaped frame 10 is restricted. With this arrangement, the reinforcing frame 3E can be positioned more accurately.

Fifth Embodiment

Figure 13:
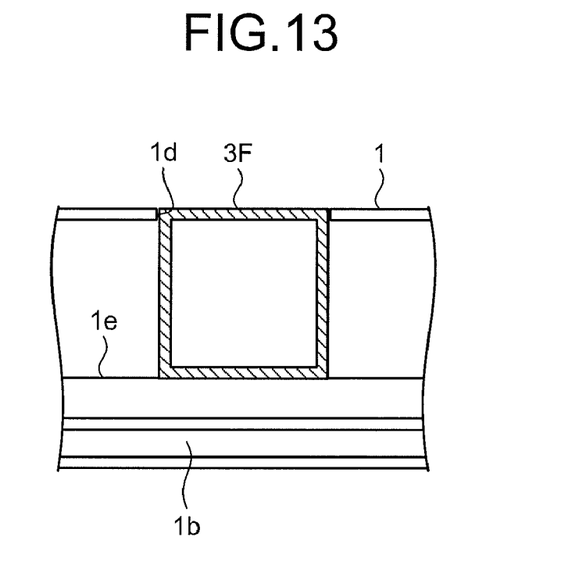
FIG. 13 is a cross-sectional view of a cross-sectional shape of a reinforcing frame of a solar battery module device according to a fifth embodiment of the present invention.

FIG. 13 is a cross-sectional view of a cross-sectional shape of a reinforcing frame of a solar battery module device according to a fifth embodiment of the present invention. A reinforcing frame 3F in the present embodiment has a quadrangular cross-sectional shape. That is, the reinforcing frame 3F has sidewall surfaces extended to a direction of a total height. Other configurations are identical to those of the first embodiment. The solar battery module device having the above configuration can also achieve effects substantially identical to those of the fourth embodiment.

Sixth Embodiment

Figure 14:
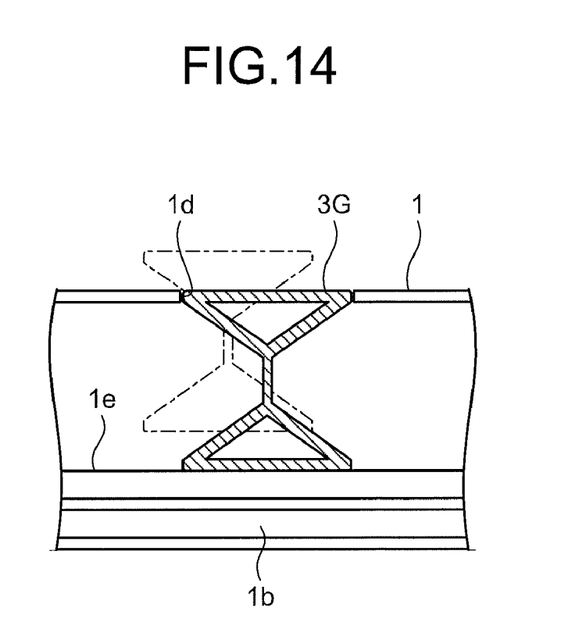
FIG. 14 is a cross-sectional view of a cross-sectional shape of a reinforcing frame of a solar battery module device according to a sixth embodiment of the present invention.

FIG. 14 is a cross-sectional view of a cross-sectional shape of a reinforcing frame of a solar battery module device according to a sixth embodiment of the present invention. A reinforcing frame 3G according to the present embodiment has a cross-sectional shape connecting vertexes of two triangles by a straight line.

According to the solar battery module device having the above configuration, even when a shaft center of the reinforcing frame 3G is deviated in the middle of insertion, inclined own sidewall surfaces are guided into the opening of the engagement notch 1d, and the reinforcing frame 3G can be easily inserted into the engagement notch 1d.

INDUSTRIAL APPLICABILITY

As described above, the solar battery module device according to the present invention is useful for a solar battery module device installed on a construction such as a house and a building. Particularly, the solar battery module device is suitable for a solar battery module device installed in areas having heavy snowfall or areas having severe wind and rain.

The invention claimed is:

1. A solar battery module device comprising:
a solar cell module formed by arranging a plurality of solar battery cells;
a rack-shaped frame having a substantially rectangular shape supporting an outer-edge portion of the solar cell module by surrounding a whole periphery of the outer-edge portion; and
a reinforcing frame that is bridged over between two opposite sides of the rack-shaped frame, and supports the solar cell module by being brought into contact with the back surface of the solar cell module when the solar cell module is bent, and
a vertical-movement locking unit that is arranged inside the rack-shaped frame, and restricts a movement of the reinforcing frame to a direction of the solar cell module by being brought into contact with the reinforcing frame, a distance between the back surface of the solar cell module and the reinforcing frame defining a gap, wherein a height of the gap between contact portions of the vertical movement locking unit and the reinforcing frame being substantially constant when the solar cell module is not bent.

2. The solar battery module device according to claim 1, wherein the rack-shaped frame has a supporting unit that comes in contact with the back surface of the solar cell module, and the vertical-movement locking unit is a projection that extends from an end of the supporting unit to an opposite side of the solar cell module.

3. The solar battery module device according to claim 1, wherein the rack-shaped frame has a pair of opposite first frames and a pair of second frames coupled between both ends of the first frames, the second frames are coupled to the first frames by having first fixing screws piercing through both ends of the first frames fastened to end-surface screw holes, and the reinforcing frame is coupled to the first frames by having second fixing screws piercing through the first frames fastened to end-surface screw holes from a direction same as a direction of the first fixing screws.

4. The solar battery module device according to claim 1, wherein the reinforcing frame is engaged with an engagement notch formed on the back surface of the rack-shaped frame.

5. The solar battery module device according to claim 4, wherein the racked-shaped frame has an internal flange, and the engagement notch is formed by having the internal flange notched by only a width of the reinforcing frame.

6. The solar battery module device according to claim 5, wherein the vertical-movement locking unit is formed by being notched by only a width of the reinforcing frame.

7. The solar battery module device according to claim 1, wherein the reinforcing frame has a point-symmetrical shape in a cross-sectional shape orthogonal to an axis in a longitudinal direction.

8. The solar batter module device according to claim 1, wherein the rack-shaped frame has a supporting unit that comes in contact with the back surface of the solar cell module, and the vertical-movement locking unit is a rib that is arranged inside the rack-shaped frame in a direction opposite to the solar cell module so as to be away from the supporting unit.

* * * * *